April 17, 1928.  
G. I. JONES  
1,666,387
TORCH TIP
Filed March 31, 1927
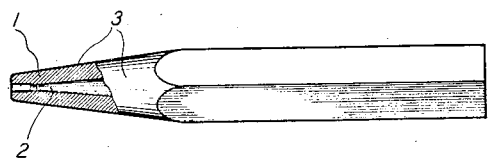
INVENTOR:  
George I. Jones,  
BY Byrnes, Townsend & Brickenstein,  
ATTORNEYS.

Patented Apr. 17, 1928.

1,666,387

UNITED STATES PATENT OFFICE.

GEORGE I. JONES, OF BUFFALO, NEW YORK, ASSIGNOR TO OXWELD ACETYLENE COMPANY, A CORPORATION OF WEST VIRGINIA.

TORCH TIP.

Application filed March 31, 1927. Serial No. 179,911.

This invention is a new tip for use with oxy-acetylene welding and cutting torches. The principal object of the invention is to provide a tip having a surface, particularly at the end around the gas outlet orifice, to which molten metal and slag particles have but a slight tendency to adhere, thereby avoiding clogging of the gas orifice by such deposits.

According to the preferred embodiment of the invention a tip composed of metal of high heat conductivity, for example copper, is provided with a coating or plating of chromium. The chromium coating or plating is highly resistant to heat and oxidation but, owing to its thinness and good heat conductivity, does not interfere with the radiation of heat from the tip. The coating is also very adherent and will not crack or peel off at the high temperatures obtaining in gas welding and cutting operations.

It is to be understood, however, that the invention is not limited in its application to a welding or cutting torch tip having a copper base or body and a coating or plating of chromium thereon. Other metals which are more highly resistant to oxidation than copper and which are difficult to wet with molten metal and oxides such as occur in welding slags, may be used as the coating metal. Examples of such metals which are suitable for the purpose indicated are nickel and cobalt.

Tips having a coating of an oxidation-resistant metal such as above described are characterized by longer life than are the plain uncoated copper tips which are now commonly used. Also, annoying delays due to clogging of the gas orifice because of adhering slag or metal are eliminated.

In the drawing is shown a perspective view, partly broken away, of a conventional welding tip used in oxy-acetylene gas welding. The tip consists of a base or body 1 of copper or similar highly conductive metal having a gas outlet passage 2. A thin coating or plating of the oxidation-resistant metal is shown at 3 as applied to all of the external portions of the tip, and also as extending a short distance within the bore of the tip at the outlet end. By plating the portion of the bore near the outlet end, wear caused by inserting a wire or similar object within the bore for cleaning purposes is prevented. Heretofore wear produced in this manner has in many cases caused the outlet orifice to assume a bell mouth shape.

What I claim is:

1. A torch tip comprising a metal having high heat conductivity and a coating of an oxidation-resistant metal thereon.

2. A torch tip comprising a metal having high heat conductivity and a coating of chromium thereon.

3. A torch tip comprising copper and a coating of chromium thereon.

4. A chromium-plated torch tip.

5. A torch tip comprising a metal body of high heat conductivity having a bore therethrough and a coating of an oxidation resistant metal thereon, said coating extending at least a short distance over the wall of said bore.

6. A torch tip comprising a metal body of high heat conductivity having a bore therethrough and a coating of chromium thereon, said coating extending at least a short distance over the wall of said bore.

In testimony whereof, I affix my signature.

GEORGE I. JONES.